United States Patent
McCusker et al.

(10) Patent No.: US 11,966,821 B2
(45) Date of Patent: Apr. 23, 2024

(54) MACHINE LEARNING MODEL BUILDER

(71) Applicant: Bank of America Corporation, Charlotte, NC (US)

(72) Inventors: Ion Gerald McCusker, Allen, TX (US); Ramakrishna R. Yannam, The Colony, TX (US); Ravisha Andar, Plano, TX (US); Bharathiraja Krishnamoorthy, Plano, TX (US); Emad Noorizadeh, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 918 days.

(21) Appl. No.: 16/997,134

(22) Filed: Aug. 19, 2020

(65) Prior Publication Data
US 2022/0058511 A1   Feb. 24, 2022

(51) Int. Cl.
   *G06N 20/00*   (2019.01)
   *G06T 1/20*    (2006.01)
   *G10L 15/06*   (2013.01)

(52) U.S. Cl.
   CPC .............. *G06N 20/00* (2019.01); *G06T 1/20* (2013.01); *G10L 15/063* (2013.01)

(58) Field of Classification Search
   CPC .......... G06N 20/00; G06T 1/20; G10L 15/063
   See application file for complete search history.

(56) References Cited

U.S. PATENT DOCUMENTS

| | | | |
|---|---|---|---|
| 9,467,795 B2 * | 10/2016 | Kreitzer | H04W 4/50 |
| 11,151,175 B2 * | 10/2021 | Lourentzou | G06F 16/313 |
| 2014/0365390 A1 * | 12/2014 | Braun | H04W 4/023 |
| | | | 705/325 |
| 2015/0245189 A1 * | 8/2015 | Nalluri | H04M 1/2746 |
| | | | 455/404.1 |
| 2015/0310729 A1 * | 10/2015 | Lampert | G08B 27/001 |
| | | | 340/539.11 |
| 2015/0331711 A1 * | 11/2015 | Huang | G06F 9/542 |
| | | | 719/320 |

(Continued)

OTHER PUBLICATIONS

"Supervisory Guidance On Model Risk Management," https://www.fdic.gov/news/financial-institution-letters/2017/fil17022a.pdf, Federal Deposit Insurance Corporation, Retrieved on Jul. 17, 2020.

(Continued)

*Primary Examiner* — Joseph J Dallo
(74) *Attorney, Agent, or Firm* — Weiss & Arons LLP

(57) ABSTRACT

A system for reducing computational load for training machine learning models is provided. The system may provide an end-to-end-solution for automating development, testing and updating of machine learning models in various operational environments. The system may determine which machine learning models included in a computer program product need to be retrained in response to a change in training data. For a computer program product that includes multiple models, the system only retrains target models, resulting in significant savings in computing resources. The system may also reduce the number of machine learning models that need to be generated for testing environments, further reducing consumption of computational resources.

20 Claims, 5 Drawing Sheets

(56) References Cited

U.S. PATENT DOCUMENTS

| | | | | |
|---|---|---|---|---|
| 2015/0379400 | A1* | 12/2015 | Tatourian | H04L 67/535 |
| | | | | 706/46 |
| 2016/0021025 | A1* | 1/2016 | Patel | H04L 47/822 |
| | | | | 370/329 |
| 2016/0224397 | A1* | 8/2016 | Arora | G06F 9/485 |
| 2016/0343093 | A1* | 11/2016 | Riland | G06Q 50/06 |
| 2017/0140285 | A1* | 5/2017 | Dotan-Cohen | G06F 9/453 |
| 2017/0178490 | A1* | 6/2017 | Kozloski | G08B 21/043 |
| 2018/0101923 | A1* | 4/2018 | Griesmann | H04W 64/00 |
| 2019/0287685 | A1* | 9/2019 | Wu | G06F 40/295 |
| 2021/0365774 | A1* | 11/2021 | Muhammad | G06N 3/08 |

OTHER PUBLICATIONS

Pranav Dar, "25 Open Datasets for Deep Learning Every Data Scientist Must Work With," https://medium.com/analytics-vidhya/25-open-datasets-for-deep-learning-every-data-scientist-must-work-with-1232371569a1, Analytics Vidhya, Mar. 28, 2018.

Himanshu Singh, "Everything You Need to Know About Hardware Requirements for Machine Learning," https://www.einfochips.com/blog/everything-vou-need-to-know-about-hardware-requirements-for-machine learning/ eInfochips, Feb. 24, 2019.

"Guidance on Model Risk Management," https://www.federalreserve.gov/supervisionreg/srletters/sr1107.htm, Board of Governors of the Federal Reserve System, Apr. 4, 2011.

* cited by examiner

MACHINE LEARNING MODEL BUILDER

FIELD OF TECHNOLOGY

Aspects of this disclosure relate to using artificial intelligence to build and test machine learning models.

BACKGROUND

Industries are increasingly relying on machine learning models to drive decision making. A machine learning model is a mathematical algorithm which makes assumptions about information it ingests. Using the assumptions, the model approximates actual properties of the information, calculates new properties or determines how to respond to the information.

Interactive voice response ("IVR") systems provide automated tools for interacting with human callers. A caller may initiate contact with an IVR system and provide inputs to the IVR system. Caller inputs may include voice data, text data and selection of options displayed to the caller. These inputs typically correspond to a caller attempting to express a purpose for contacting the IVR system. The IVR system may use a variety of techniques to discern a meaning of caller inputs and efficiently satisfy the caller's purpose.

An IVR system may not be able to discern the purpose or goal of a caller. In such instances, the IVR system may link the caller to a human agent. An IVR system may also "think" that it does understand the purpose or goal of the caller. However, the IVR system may in fact have misinterpreted the caller inputs. In some scenarios, the IVR system may seem to correctly interpret individual caller inputs. However, the IVR system may in fact be unable to understand a greater context of the caller input within a larger conversation.

Typically, IVR system include multiple and interconnected machine learning models for discerning a meaning of caller inputs and efficiently satisfy the caller's purpose. Each of the machine learning models must be rigorously trained and tested in various operating and testing environments before being deployed. Training and testing of complex machine learning models require significant computing resources. It would be desirable to provide a more efficient system for testing and training machine learning models.

Furthermore, it is technically challenging to test IVR systems that include multiple and interconnected machine learning models. It is technically challenging to identify how to cure defects identified in a machine learning system and whether curing the defects will cause a misinterpretation of caller inputs in other scenarios.

As described herein, a MACHINE LEARNING MODEL BUILDER provides technical solutions for training and testing complex machine learning systems.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
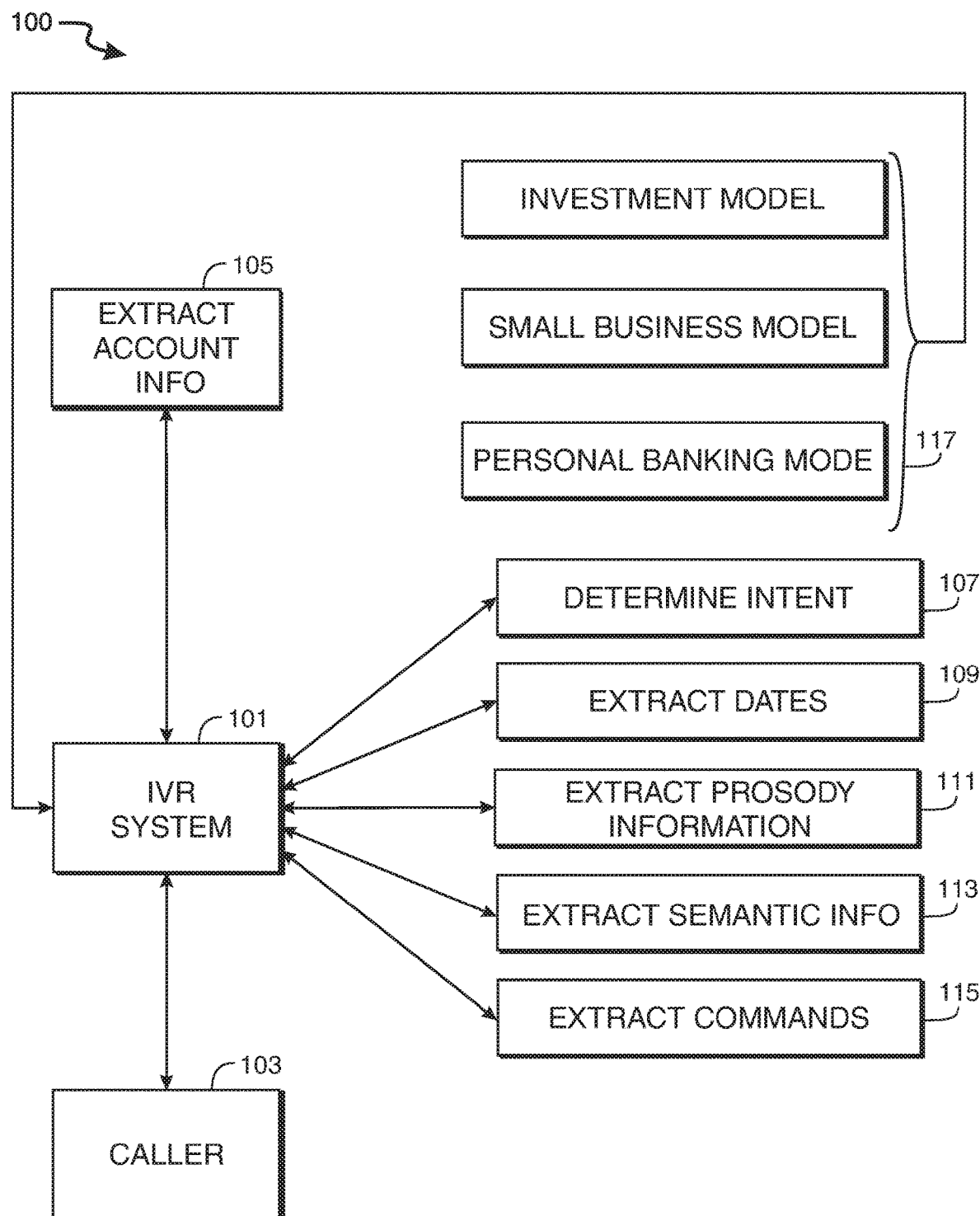
FIG. 1 shows an illustrative system in accordance with principles of the disclosure.

Apparatus for an artificial intelligence ("AI") system for training machine learning models is provided. The system may include a frontend user interface. The frontend user interface may provide software tools for changing training data associated one or more machine learning models. The models may be included in a computer program product. The computer program product may include an interactive voice response ("IVR") system.

An IVR system may provide automated tools for interacting with human callers. An IVR system may include multiple and interconnected machine learning models. A caller may initiate contact with an IVR system and provide inputs to the IVR system. The caller inputs may include voice data, text data and selection of options displayed to the caller. These inputs typically correspond to a caller attempting to express a purpose for contacting the IVR system.

The IVR system may utilize machine learning models to discern a meaning of caller inputs and efficiently satisfy the caller's purpose. For example, the IVR system may include machine learning models that determine caller intent and extract dates, account types, and amounts from caller inputs.

Machine learning models may be trained how to interpret data associated with a specific computing challenge. Illustrative computing challenges may include classifying images or speech recognition. Because each of these challenges presents unique, nuanced data analysis techniques, each challenge may require its own set of training data.

Training data sets are large and training models using these data sets requires significant computing resources. Example training data sets and sizes are shown below in Table 1:

TABLE 1

Illustrative Computational Problems and Training Data

| Computational Problem | Illustrative training data | Size |
|---|---|---|
| Image recognition | 330K images<br>5 captions per image<br>1.5 million objects<br>80 object categories<br>250,000 people images | ~25 MB |
| Natural Language Processing | ~30,000,000 sentences and translations | ~15 GB |
| Audio/Speech Datasets | ~100,000 music tracks | ~1000 GB |

Using specialized training data, models included in an IVR system may be trained to discern the meaning of caller inputs. The AI model training system may include a model training subsystem. The model training subsystem may use specialized training data to train a plurality of machine learning models included in the IVR system how to understand caller inputs that are not included in the specialized training data.

Use of machine learning modes in connection with financial transactions is subject to rigorous regulations. Machine learning models deployed to execute financial transactions must be rigorously trained and tested in various operational environments before being deployed. In the context of an IVR system, the regulations ensure machine learning models perform and execute financial transaction expected and authorized by callers. Typically, implementation, training and testing requires significant computing resources.

An illustrative CPU (central processing unit) model training system can train an average of ~115 examples/second. A model training subsystem may include a GPU (graphics processing unit) based training system can train an average of ~14 k examples/second. Larger scale model training may utilize a GPU cluster for multi-GPU computing. Other viable computing options for training machine learning models include TPUs (Tensor Processing unit) and FPGAs (Field Programmable Gate Arrays). Such systems are specially designed for training machine learning models.

The model training subsystem may include CPU and/or GPU based training system. However, model training systems and associated computing hardware typically consumes significant power. For example, a GPU training system is capable of perform operations on a batch of images of 128 or 256 images at once in just a few milliseconds. However, the power consumption for the GPU system is around ~250 W and requires a computer system that requires an additional 150 W of power, for a total power consumption of about 400 W.

The signification computing resources needed to train machine learning models poses a technical challenge to retraining of models in an IVR system. For example, models may need to be retrained in response to updates or changes to the training data set originally used to train a model. When changes to the training data are received, they may or may not impact all models in included in a computer program product such as an IVR system. Retraining all models in computer program product may require significant computing resources.

The AI model training system disclosed herein provides a technical solution for determining which models in an IVR system need to be retrained in response to a change in training data. The AI system also utilizes technical innovations to meet rigorous regulatory requirements governing use of machine learning models for financial transactions. The AI system is configured to limit retraining to targeted models, resulting in significant savings of computing resources. The AI system also eases the regulatory compliance burden by reducing uncertainty regarding which models have been trained with which data sets.

The AI system may include an AI engine. The AI engine may detect changes made to model training data. Changes to model training data may be received via the frontend user interface. The AI engine may identify a target model. The target model may be one of a plurality of models included in a computer program product. The AI engine may identify a target model that needs to be retrained in response to the detected changes in the training data.

The AI engine may push the target model to the model training subsystem. AI engine may trigger retraining of the target model by the model training subsystem. By isolating the target model for retraining, the AI engine reduces a number of models that are retrained by the model training subsystem per unit of time. By isolating the target model for retraining, the AI engine reduces a computational load of the model training subsystem per unit of time.

The AI engine may be configured to extract a subset of the training data. The subset of the training data may be needed to retrain the target model. The subset of training data may be smaller in size than the entire training data set. The AI engine may transfer the extracted training data to the model training subsystem and instruct the subsystem to retrain the target model using the extracted subset. By reducing a size of training data used for retraining a model, the AI engine further reduces a computational load of the model training subsystem per unit of time.

After retraining the target model, the model training subsystem may serialize the retrained target model. The serialization process saves a trained machine learning as an object in a stream of bytes. After being serialized, the trained model may be stored in memory, in a database, or in a file. The model training subsystem may serialize the retrained model with the extracted training data. Serializing the target model with the training data allows the AI engine to determine whether a model will need to be retrained in response to any future changes to the training data set serialized with the model.

In response to detecting changes to training data, the AI engine may identify, for each of a plurality of models included in a computer program product, whether training data serialized with each model is impacted by the changes applied to the training data. For each model that the AI engine determines is impacted by the changes, the AI engine may classify as a target model. The AI engine may push the target model and the changed training data to the model training subsystem. The AI engine may trigger retraining of the target model by the model training subsystem using the changes made to the training data.

In some embodiments, the AI engine may extract a subset of the training data that includes the detected changes. The AI engine may instruct the model training subsystem to retrain the target model using only the changes to the training data—i.e., retrain the target model using the extracted subset of training data. Retraining the target model using only the extracted subset may further reduce a computational load of the model training subsystem by reducing a size of the training data used by the model training subsystem to retrain the target model.

The AI engine may log each instance of model retraining. The AI engine may track and log data lineage associated with changes to training data serialized with a model. Data lineage may include an original training data used to train a model and subsequent changes applied to the training data. The AI engine may log users that applied changes to the training data and whether a target machine learning model was retrained in response to the detected changes.

The AI engine may publish a retrained target model. The AI engine may control publishing of retrained models to one or more testing environments. Illustrative testing environments may include a development environment, a certification environment and a production environment. The AI engine may track and log data lineage as the retrained model is tested in the various environments. For example, the AI engine may track and log results of testing a computer program product that includes the retrained model in multiple testing environments.

A retrained model be tested to identify errors that may produce inaccurate outputs when compared to a design objective and intended model use. Exemplary errors may occur when performing mathematical calculations and quantifications, application of theory, choice of sample design and numerical routines, selection of inputs and estimation, and implementation in information systems.

Model testing may identify models that may be used incorrectly or inappropriately. Even a fundamentally sound model that produces accurate outputs consistent with a design objective may produce unreliable outputs if misapplied or misused. The testing environments may identify model limitations and assumptions, and assesses the potential impact of the limitations and assumptions. The testing environments may reveal deterioration in model performance over time and may set thresholds for acceptable error levels or other model performance metrics.

Conventionally, each testing environment generates its own version of a machine learning model. The testing environment may utilize its generated model for testing purposes. However, such a system does not ensure that each testing environment is testing the identical model. Allowing the AI engine to control publication of the models to the testing environments may ensure regular and methodical testing of machine learning models. Regular and methodical testing may allow detection of whether changes in products, exposures, activities, or market conditions necessitate adjustment, redevelopment, or replacement of a model. Regular and methodical testing may ensure timely verification that any extension of a model beyond its original scope is valid.

The AI engine may publish a retrained model to a testing environment by directing a testing environment to a single location storing the serialized target model. The AI engine may direct multiple testing environments to the same storage location. By directing each development environment to the same storage location, the AI engine may ensure that each testing environment is testing the identical model trained using the identical training data.

By directing each testing environment to the single storage location, the AI engine may reduce the number of models that are generated by the model training subsystem. By directing each testing environment to the single storage location, the AI engine may also ensure that each testing environment is accessing the latest and most up-to-date copy of the model.

In some embodiments, a first testing environment may direct a second testing environment to the single location. The second testing environment may direct a third testing environment to the single location.

The AI engine may determine a target subset of models included in the computer software product that need to be retrained based on the changes to training data. The AI engine may pass only the subset of models to the model training subsystem. The AI engine may thereby reduce computational overhead required by the model retraining subsystem to update the computer software product in responses to changes to the training data. After testing a retrained target model, the AI engine may publish the retrained model to one or more development environment.

The AI system may include a first model repository. The first model repository may store a target model without associated training data. The system may include a second model repository. The second model repository may store the target model and changed training data used by the model training subsystem to retrain the target model. The AI engine may extract the target model from the first repository for retraining. After retraining the target model, the AI engine may direct the testing environments to the second model repository.

Methods of using artificial intelligence to train machine learning models are provided. Methods may include detecting a change in training data associated with a computer program product. The computer program product may include two or more machine learning models. Methods may include determining a target model utilized by the computer program product that needs to be retrained in response to the detected changes in the training data.

Training data may include a mapping of a spoken phrases to a label. A machine learning model may learn, based on associations linking a spoken phrase to a label, how to interpret caller inputs. Illustrative changes to training data may include deleting a label, adding a label or changing a label associated with a spoken phrase included in the training data.

Methods may include extracting a target model from a model repository. Methods may include retraining the extracted target model using the detected changes in the training data. The target model may represent less than all of the machine learning models included in the computer program product. Limiting model retraining to the target model may reduce a computational load required for updating the computer program product in response to the changes in the training data.

After retraining the target model, methods may include packaging the target model with the changes to the training data. Packaging the target model with the changes may include linking a serialized copy of the target model to the training data in a database. After retraining the target model, methods may include overwriting a copy of the target model stored in a model repository. The copy of the target model stored in the model repository may be overwritten with the retrained target model packaged with the changes to the training data.

Methods may include testing the target model in at least three testing environments. Methods may include directing each of the three testing environments to a single copy of the target model that is packaged with the training data. Methods may include logging access by the each of the three testing environments to the copy of the target model stored in the model depository and associated with the changes to the training data.

Methods may include generating a genealogical tree for a target model. The genealogical tree may associate the target model with various instances of training data that have been used to train the target model. Methods may include generating a genealogical tree for the computer program product. The genealogical tree of the computer program product may associate each model included in the product with a current file location of a model and the most recent training data used to train each model. The genealogical tree of the computer program product may include the different version of the training data used to train each model.

A genealogical tree may be generated by the AI engine. Genealogical trees may enhance accountability and traceability of machine learning models. Genealogical trees may provide a point of reference for ascertain training data that has been used to train a model and a version of each model that is, or has been, deployed in a production release of a computer program product. Such an architecture allows the AI engine to utilize training data and changes to training data to determine when to retrain individual models in a multi-model computer program product. Such an architecture may reduce a computational load of a model training system.

An artificial intelligence ("AI") system for reducing computational load when training machine learning models is provided. The AI system may include a frontend user interface. The user interface may be configured to provide access to training data associated with a plurality of models. The user interface may apply changes to the training data. The AI system may include a model training system. The model training system may be a GPU training system. The model training system may be configured to train and serialize machine learning models.

The AI system may include a model services computer server. The model services computer server may be a network connected computer system. A computer server, as disclosed herein, may include a processor circuit. The processor circuit may control overall operation of the server and its associated components. The processor circuit may include hardware, such as one or more integrated circuits that form a chipset. The hardware may include digital or analog logic circuitry configured to perform any suitable (e.g., logical) operation.

For example, a computer server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of computer executable instructions of the computer server may be embodied in hardware or firmware components of a computer server.

A computer server may include cloud computing and virtualization implementations of software. Such implementations may be designed to run on a physical server supplied externally by a hosting provider, a client, or other virtualized platform. Software application programs, which may be used by the computer server, may include computer executable instructions for invoking user functionality related to communication, such as email, short message service ("SMS"), and voice input and speech recognition applications. Software application programs may utilize one or more algorithms, as disclosed herein, that formulate predictive machine responses, formulate database queries, serialize machine learning models, compare training data sets, test machine learning models, track input/output of machine learning models, or any other suitable task.

A computer server may include a communication circuit. The communication circuit may include a network interface card or adapter. When used in a WAN networking environment, a computer server may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

A computer server may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A computer server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices, mobile phones, multiprocessor systems, minicomputer systems, microprocessor systems, mainframe computers, distributed computing environments that include any of the above systems or devices, and the like.

A computer server may utilize computer-executable instructions, such as program modules, executed by a processor. Generally, program modules include routines, programs, objects, components, data structures, etc. that perform particular tasks or implement abstract data types. A computer server may be operational with distributed computing environments where tasks are performed by remote processing devices that are linked through a communications network. In a distributed computing environment, program modules may be located in both local and remote computer storage media including memory storage devices. A computer server may rely on a network of remote servers hosted on the Internet to store, manage, and process data (e.g., "cloud computing" and/or "fog computing").

A computer server disclosed herein may be produced by different manufacturers. For example, a program developer may connect to a frontend user interface via a first server, and an AI engine may be run on a second server, a model training system may be run on a third server and a model testing environment may be run on a fourth server. A computer server may capture data in different formats. A computer server may use different data structures to store captured data. A computer server may utilize different communication protocols to transmit captured data or communicate with other systems. Despite such operational differences, computer servers may be configured to operate substantially seamlessly to interact with a human caller, execute machine learning models and run an AI engine across different systems operating systems, hardware or networks.

The model services server may run an AI engine. The AI engine may be configured to control a computational load of the model training system. The AI engine may examine changes applied to the training data. The AI engine may determine a target model set. The target model set may include machine learning models included in a plurality of models part of a computer program product. An IVR system may be an illustrative computer program product. Models include in the target model set may include models that the AI engine has determined need to be retrained in response to the changes applied to the training data.

The AI engine may determine which machine learning models included in a computer program product need to be retrained when training data is updated. The AI engine may determine which models to retrain by submitting the updated training data set to each of the plurality of models. The AI engine may track outputs generate by each model in response to the updated training data set. The AI engine may determine, based on the outputs, whether the changes to the training data set trigger a threshold deviation between expected and actual outputs of each model. Detection of the threshold deviation may indicate a model needs to be retrained.

The AI engine may push the target model set to the model training system. The AI engine may trigger retraining, by the model training system, of the models included in the target model set. The target model set may include less than all of the models in a computer program product. By triggering retraining of only the target model set, the AI engine reduces a number of models that are trained by the model training system per unit of time. By triggering retraining of only the target model set, the AI engine reduces a computational load of the model training system per unit of time.

The AI system may include an authentication layer. The authentication layer may control access to the training data. The authentication layer may ensure that only authorized users are allowed to change the training data.

The AI system may include a model publishing system.

The model publishing system may include a network attached storage ("NAS") server. The NAS server may provide centralized storage of serialized and retrained models included in the set of target models. The NAS server may provide centralized access to retrained models by a heterogenous group of development servers. The AI system may include a computer network providing each member of the heterogenous group access to the network attached storage server.

The heterogenous group may include a first testing server. The first testing server may test the set of target models in a development environment. The heterogenous group may include a second testing server. The second testing server may test the set of target models in a certification environment. The heterogenous group may include a third testing server. The third testing server may test the set of target models in a production environment.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative system 100. System 100 includes IVR system 101. IVR system 101 includes multiple machine learning models 105-115. Machine learning model 105 is configured to extract account information from inputs received from caller 103. IVR system 101 includes machine learning model 107 for determining an intent of inputs received from caller 103. Machine learning model 109 is configured to extract dates from the input received from caller 103.

Machine learning model 111 is configured to extract prosody information from inputs received from caller 103. Prosody information may include non-semantic aspects of speech. For example, prosody information may include changes in pitch, loudness, timbre, speech rate, and pauses. Machine learning model 113 is configured to extract semantic information from inputs received from caller 103. Semantic information may include logical aspects of meaning, such as sense, reference, implication, veracity, and logical form of speech. Sematic information may include word meanings and relationships between words.

Machine learning model 115 is configured to extract commands from inputs received from caller 103. Commands may be a directive from caller 103 instructing IVR system 101 to perform a task or function.

IVR system 101 may service operational domains 117. Each of operational domains 117 may have their own set of machine learning models 105-115. Each of operational domains 117 may use independent training data to generate machine learning models that are tuned to recognize specific nuances, language, commands and terminology associated with services or products offered by domains 117.

Training each of machine learning models 105-115 on independent data sets prepared for each of operational domains 117 may be computationally intensive. For example, each of models 105-115 may need to be trained for each domain—a total of eighteen models. When training data associated with each of domains 117 is changed, conventionally, each of models 105-113 may need to be retrained to ensure that changes to training data are incorporated into the respective machine learning models. Conventional systems would require retraining a total of eighteen models across all three operational domains 117.

Figure 2:
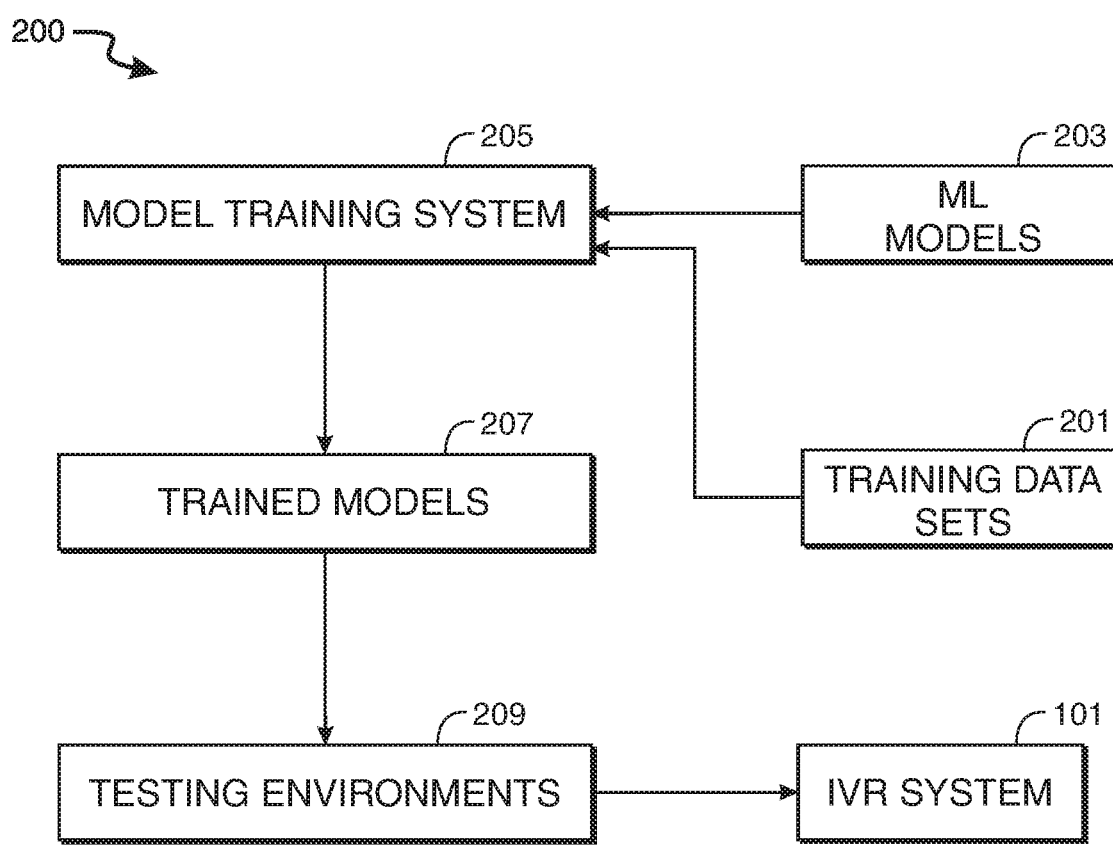
FIG. 2 shows an illustrative system in accordance with principles of the disclosure.

FIG. 2 shows illustrative testing system architecture 200. Architecture 200 may be used to test machine learning models 203 before they are deployed within IVR system 101 and interact with input received from caller 103. Machine learning models 203 may include one or more of machine learning models 105-115 (shown in FIG. 1). Architecture 200 shows that model training system 205 utilizes training data sets 201 to train machine learning models 203. Model training system 205 may train machine learning models 203 to understand caller inputs based on analysis of training data sets 201.

For example, during training, machine learning models 203 may assign weights or importance to specific aspects of test caller inputs included in training data 201. Trained models 207 may use the "learned" weights or importance to understand new caller inputs. Trained models 207 may be serialized and written to a file location.

Testing environments 209 may verify that after training, models 203 operate in an expected and logical manner. Testing environments 209 may verify that trained models 203 interpret new caller inputs in an expected and logical manner. Testing environments 209 may verify that trained models 203 interpret test caller inputs in an expected and logical manner. Testing environments 209 may include development, certification and production testing environments.

When training data 201 associated with machine learning models 203 is changed, machine learning models 203 may need to be retrained. After retraining, the models are retested in testing environments 209. Such an approach typically requires retraining and retesting all the machine models included in a computer program product, including those whose functionality may not have been impacted by the changes to training data 201. Unnecessary retraining and retesting of machine learning models causes waste of expensive and valuable computer resources.

Figure 3:
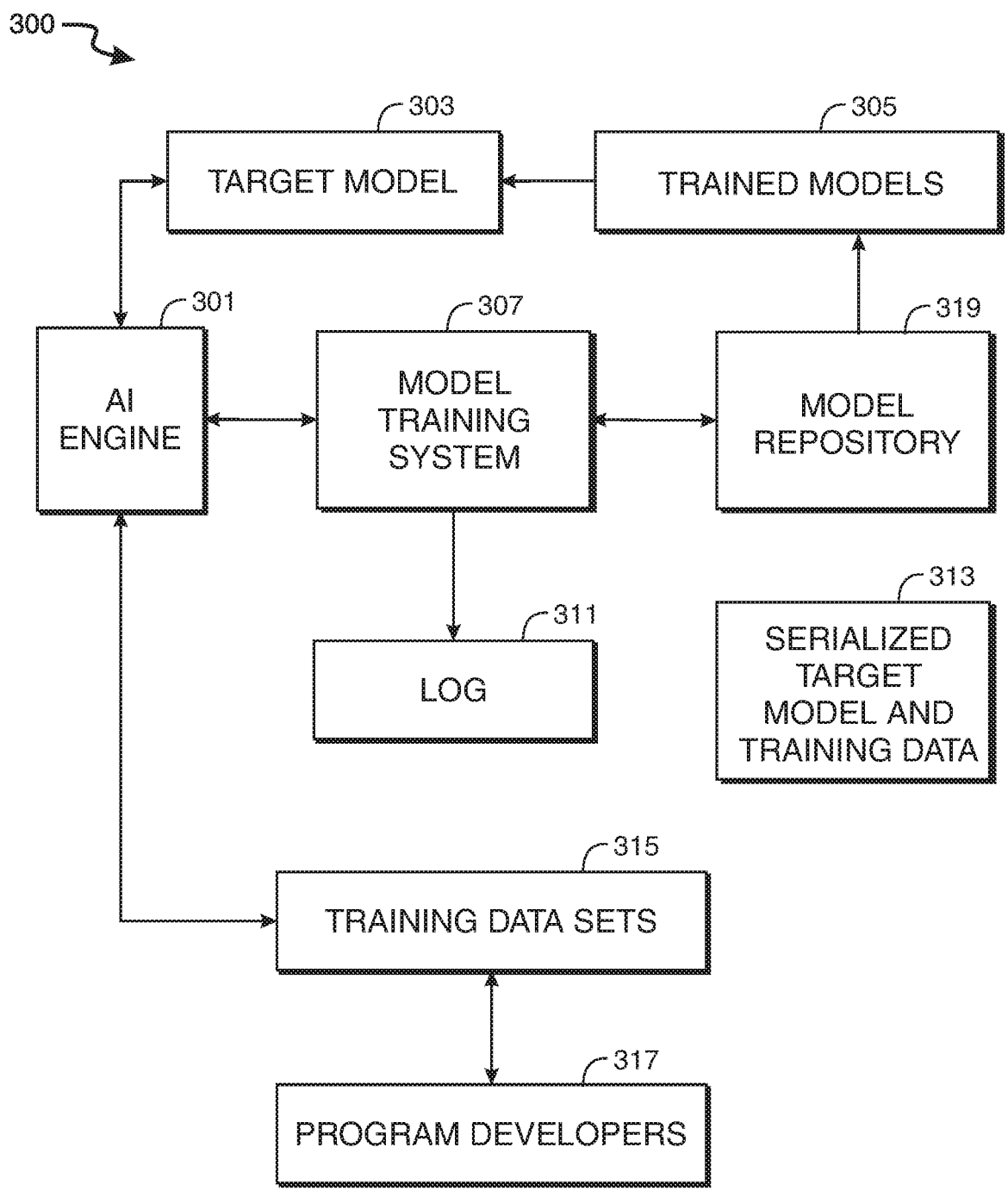
FIG. 3 shows an illustrative system in accordance with principles of the disclosure.

FIG. 3 shows illustrative system 300 for eliminating waste of expensive and valuable computer resources. System 300 includes AI engine 301. AI engine 301 may monitor changes to training data 315. For example, program developers 317 may change training data 315. Program developers 317 may change training data 315 when fixes bugs or adding new features to a computer program product.

In response to detecting changes to training data 315, AI engine 301 may determine machine learning models stored in model repository 319 that are impacted by the changes. For example, AI engine 301 may determine that training data 315 associated with some models has not been changed since those models have been last trained. In some embodiments, AI engine 301 may submit exemplary test inputs to a model. AI engine 301 may determine whether one or more models stored in repository 309 need to be retrained based on output of the model generated in response to the test inputs.

FIG. 3 shows that AI engine 301 has extracted target model 303 from among trained models 305. AI engine 301 has identified target model 303 as requiring retraining as a result of changes to training data 315. AI engine 301 may submit target model 303 and changed training data 315 to model training system 307. Model training system 307 may retrain target model 303 using changes applied to training data 315. Logging subsystem 311 may record which target models and associated training data have submitted by AI engine 301 to model training system 307.

Records created by logging subsystem 311 allow for tracking of model retraining and training-process verification, especially as they relate to new products or product features (e.g., reasons for changes to training data 315). Records created by logging subsystem 311 provide ongoing monitoring for evaluating whether machine learning models included in a computer program product are operational with features and functionality provided by the computer program products.

After model training system 307 completes retraining of target model 303, the retrained target model may be serialized and stored in model repository 319. The newly retrained and serialized model may be stored in model repository 319 together with the updated training data used by model training system 307 when retraining target model 303.

AI engine 301 ensures that only a subset of machine leaning models included in a computer program product are retrained in response to changes to training data. By isolating a target models for retraining, AI engine 301 reduces the number of machine learning models that are retrained by model training system 307. By isolating select target model 303 for retraining, AI engine 301 reduces a computational load of the model training system 307.

In some embodiments, AI engine 301 may submit serialized and retrained model 313 for retesting to testing environments 209 (shown in FIG. 2). By limiting retesting to only the target models that have been retrained, AI engine 301 may reduce the number of machine learning models that are retested by testing environments 209, reducing a computational load of the testing environments 209.

Figure 4:
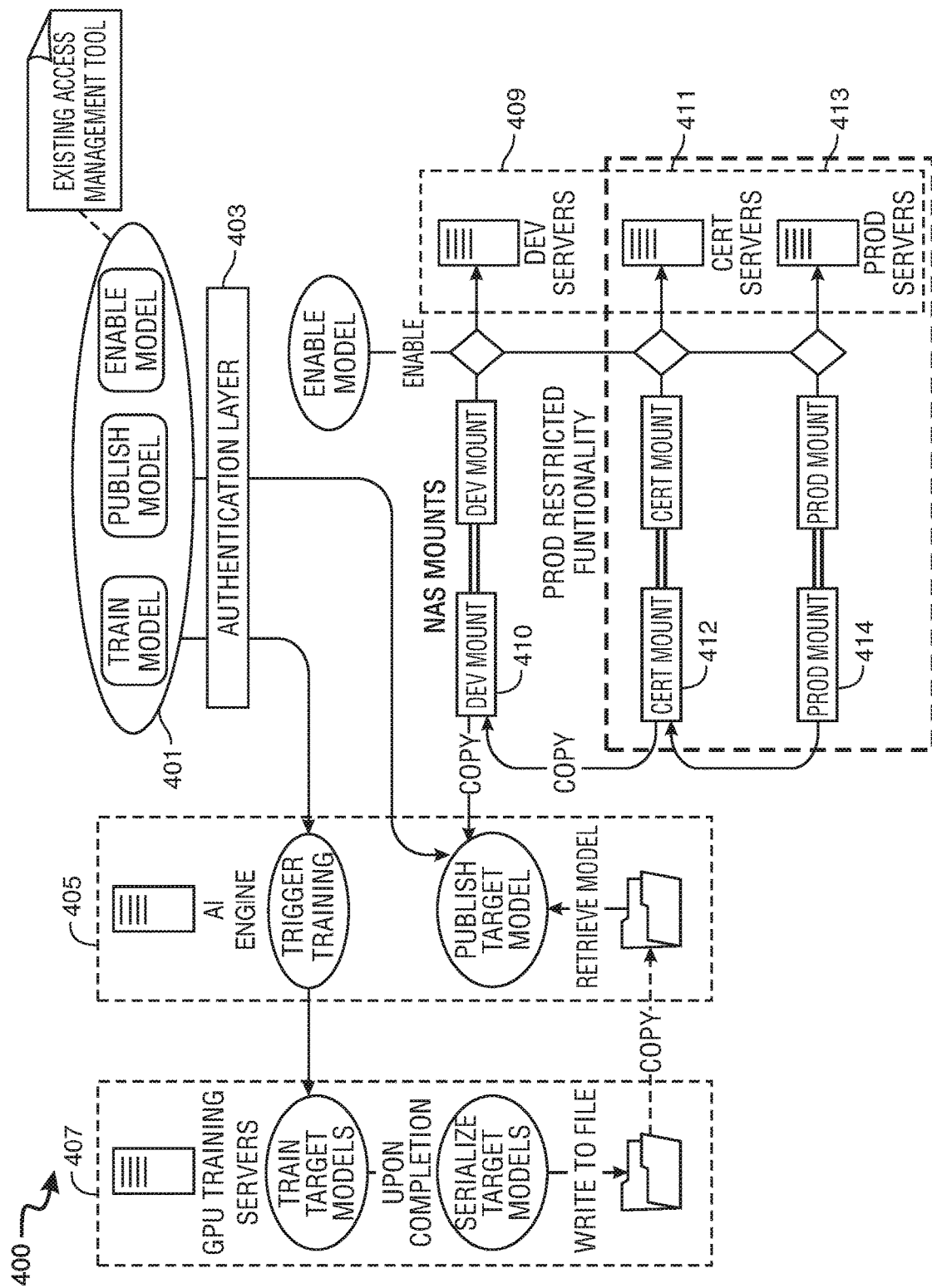
FIG. 4 shows an illustrative system in accordance with principles of the disclosure.

FIG. 4 shows illustrative system 400. System 400 includes frontend user interface ("UI") 401. UI 401 provides users, such program developers 317, access to training data 201. UI 401 may provide program developers 317 access to software tools for training, publishing and enabling models.

When program developers 317 make changes to training data 315, AI engine 405 may determine whether any machine learning models need to be retrained as a result of the changes. AI engine 405 may package retrained models with the training data used to train the target model. AI engine 405 may also determine that models whose training data has not be changed do not need to be retrained.

Authentication layer 403 only allows authorized users to input changes to training data 315. When AI engine determines that changes to training data 315 are significant to warrant a retraining of a target machine learning model, AI engine 405 may trigger model training system 407 to perform the retraining.

AI engine 405 may compare changes to the training data with training data associated with machine learning models included in a computer program product. AI engine 405 may select any model whose training data has been changed for retraining. AI engine 405 may identify a target machine learning model for retraining based on comparing versions of training data or testing a model using the changed training data and comparing output of the model in response to changed training data to an expected output of the model.

AI engine 405 may direct model training system 407 to target models and associated changed training data. In some embodiments, AI engine 405 may extract target models and training data and transfer the extracted target model and training data to models training system 407. In some embodiments, AI engine 405 may direct model training system 407 to a storage location of the target model and associated training data. AI engine 405 may instruct model training system 407 to retrain a target model identified by AI engine 405 using the updated training data. Model training system 407 may serialize the target model after the retraining and write the retrained model to a file.

After a model is retrained and written to a file, the retrained model may be ready for testing. Program developers 317 may utilize UI 401 to issue a command to test a retrained model. Authentication layer 403 may prevent unauthorized users from issuing testing commands. In response to detecting an authorized testing command, AI engine 405 may retrieve the model from its file location and publish the model to one or more of testing environments 409, 411 and 413.

Publishing a model may include copying the model to network accessible storage locations 410, 412 and/or 414. A testing environment may include development testing servers 409. Development testing servers 409 may include a run-time environment, hardware and software utilities for debugging machine learning models. AI engine 405 provides development testing servers 409 access to the serialized model for testing via storage location 410.

Development testing servers may confirm that a target model is meeting its functional requirements. When a target model passes the development testing, the target model may be further tested by certification testing servers 411. Certification testing servers 411 may include a run-time environment, hardware and software utilities for determining whether a machine learning model meets regulatory standards. AI engine 405 provides development testing servers 411 access to the serialized model for testing via storage location 410. In some embodiments, after completion of testing, development testing servers 409 may copy the serialized model from location 410 to location 412.

AI engine 405 provides certification testing servers 411 access to the serialized model for testing via storage location 412. In some embodiments, after completion of testing, certification testing servers 409 may copy the serialized model from location 412 to location 412. Using AI engine 405 to provide testing environments access to a target model ensures that each testing environment is testing the identical model. Using AI engine 405 to coordinate access to a target model ensures that each of the testing environments 409, 411 and 413 access and test the identical model.

When a target model passes certification testing, the target model may be further tested by production testing servers 413. Production testing servers 413 provide a computing setting for testing the target model using live data provided by end users such as caller 103.

AI engine 405 provides centralize access, testing and training of targeted machine learning models impacted by changes to training data. AI engine 405 allows targeted machine learning models to be generated once (based on updated training data) and one copy of the retrained model is propagated to each of the different testing environments. AI engine 405 reduces a computational burden on model training system 407. AI engine 405 also simplifies tracking of the retrained model as it progresses through testing environments 409, 411 and 413.

Figure 5:
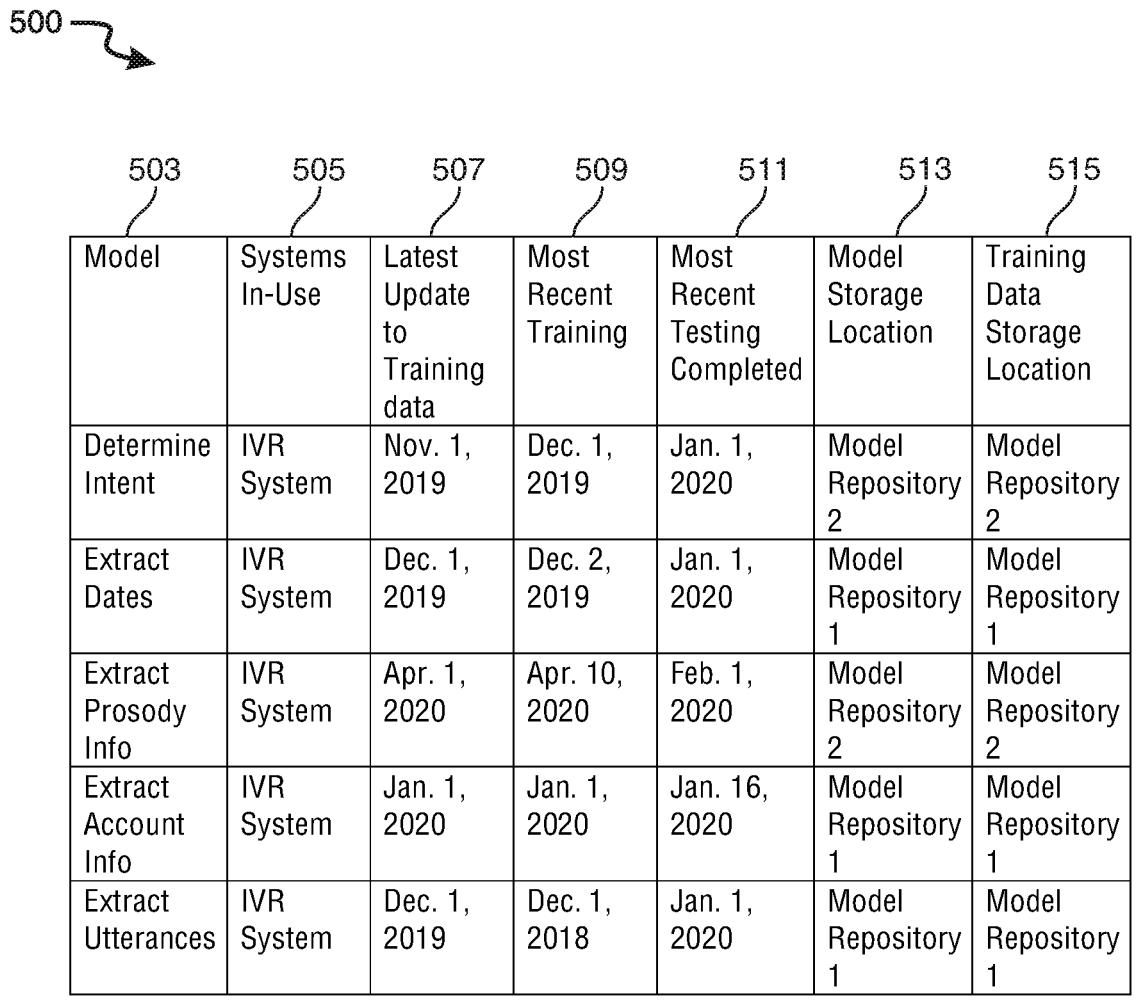
FIG. 5 shows illustrative records generated in accordance with principles of the disclosure.

FIG. 5 shows illustrative information 500 generated by AI engine 405 (shown in FIG. 4). Information 500 may demonstrate that a target model has been regularly retrained in response to changes to training data associated with that model. Information 500 may validate operation of AI engine 405. Information 500 may document that target models have been appropriately tested and their functionality validated before commercial deployment. Information 500 documents that training data sets have been updated in response to changed circumstances, such as product feature updates or economic changes. Information 500 also inventories retrained models and training data used for the retraining. AI engine 405 may populate columns and rows of information 500.

Column 503 lists an identifier for each of a plurality of models. Column 505 shows which computer program products currently utilize each model listed in column 503. Column 507 shows when training data associated with each model listed in column 503 has last been updated. Column 509 shows when a model listed in column 503 has most recently been retrained using the updates to training data shown in column 507.

Column 511 shows when a retrained model has last been tested after the retraining date shown in column 509. Column 513 shows the file location where the retrained model (e.g., serialized version) is currently stored. The retrained model may be stored in a file location after the retraining shown in column 507 and/or after testing shown in column 511.

Column 515 shows a storage location for current training data associated with models shown in column 503. AI engine 405 may access the storage location shown in column 515 to determine whether a model needs to be retrained based on further updates to the training data stored in the location identified by column 515. Columns 513 and 515 also show that after retraining, a target model may be stored in the same location as current training data associated with the retrained model.

Thus, apparatus and methods for a MACHINE LEARNING MODEL BUILDER have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An artificial intelligence ("AI") system for training a machine learning model, the system comprising:
    a frontend user interface that provides software tools for changing training data associated with a plurality of machine learning models included in a computer program product run on a first server;
    a model training subsystem that, using the training data, is configured to train the plurality of machine learning models to understand new data that is not included in the training data; and
    an AI engine that:
        detects changes made to the training data via the frontend user interface;
        identifies a target model, within the plurality of models, that needs to be retrained in response to the detected changes made to the training data;
        extracts the target model from the first server;
        pushes the target model to the model training subsystem in a second server; and
        triggers retraining of the target model by the model training subsystem, thereby reducing a number of the plurality of models that are retrained by the model training subsystem per unit of time and reducing a computational load of the model training subsystem per unit of time.

2. The AI system of claim 1, wherein:
    the AI engine is further configured to:
        extract a subset of the training data for retraining the target model; and
        transfer the extracted subset of the training data to the model training subsystem; and
    after retraining the target model using the extracted subset of the training data, the model training subsystem serializes the target model with the extracted subset of the training data.

3. The AI system of claim 2, wherein the AI engine is configured, in response to detecting the changes made to the training data, to:
    identify, for each of the plurality of models, whether the training data serialized with each model is impacted by the changes made to the training data; and
    for each set of training data impacted by the changes:
        extract the corresponding model serialized with the impacted training data from the first server;
        push the corresponding model serialized with the impacted training data to the model training subsystem in the second server; and
        trigger retraining of the target model by the model training subsystem using the changes made to the training data.

4. The AI system of claim 1, wherein the AI engine logs:
    each instance of model retraining; and
    data lineage of the training data associated with each retrained target model.

5. The AI system of claim 2, wherein the AI engine publishes each retrained target model to at least three testing environments by directing each of the three testing environments to a single location storing the serialized target model.

6. The AI system of claim 1, wherein:
    the model training system serializes the retrained target model to a network accessible storage location;

a first testing environment directs a second testing environment to the network accessible storage location; and
the second testing environment directs a third testing environment to the network accessible storage location.

7. The AI system of claim 1, the AI engine further configured to:
determine a target subset of models included in the computer software product that need to be retrained based on the changes made to the training data; and
push only the subset of models to the model training subsystem, thereby reducing computational overhead required by the model retraining subsystem to update the computer software product in responses to the changes to the training data.

8. The AI system of claim 1 further comprising:
a first model repository storing a serialized version of the target model without associated training data; and
a second model repository storing the serialized version target model and the changed training data used by the model training subsystem to retrain the target model;
wherein the serialized version of the target model is extracted from the first repository for retraining and a testing environment is directed to the second model repository.

9. An artificial intelligence ("AI") method of training machine learning models, the method comprising:
detecting a change made to training data associated with a computer program product stored in a first server;
determining a target model utilized by the computer program product that needs to be retrained in response to the detected changes made to the training data;
extracting the target model from a model repository in the first server; pushing the target model to a second server; and
retraining the target model using the detected changes made to the training data in the second server;
wherein the target model represents less than all machine learning models of the computer program product, and retraining the target model reduces a computational load for updating the computer program product in response to the changes made to the training data.

10. The AI method of claim 9 further comprising, after retraining the target model, packaging the retrained target model with the detected changes made to the training data.

11. The AI method of claim 10 further comprising, after the retraining, pushing the retrained target model that is packaged with the changes made to the training data to the first server.

12. The AI method of claim 11 further comprising testing the retrained target model in at least three testing environments.

13. The AI method of claim 12 further comprising directing each of the three testing environments to the retrained target model packaged with the training data.

14. The AI method of claim 13 further comprising logging access of the each of the three testing environments to the retrained target model stored in the model depositary and associated with the changes made to the training data.

15. The AI method of claim 9, wherein the change made to the training data comprises deleting a label, adding a label or changing a label associated with at least one data item in the training data.

16. The AI method of claim 15, wherein each data item in the training data comprises a mapping of a human voice input to the label.

17. An artificial intelligence ("AI") system for reducing a computational load of a model training system, the system comprising:
a frontend user interface configured to:
provide access to training data for a plurality of machine learning models in a first server; and
apply changes to the training data;
a GPU model training system configured to train and serialize one or more of the plurality of models in a second server; and
a model services server running an AI engine configured to regulate a computational load of the GPU model training system, wherein the AI engine:
examines the changes applied to the training data;
determines a target model set comprising models in the plurality of machine learning models that require retraining in response to the changes applied to the training data;
extracts the target model set from the first server;
pushes the target model set to the GPU model training system in the second server; and
triggers retraining by the GPU model training system of the target model set instead of the entire plurality of machine learning models, thereby reducing a number of machine learning models that are trained by the GPU model training system per unit of time and reducing a computational load of the GPU model training system per unit of time.

18. The AI system of claim 17 further comprising an authentication layer that controls access to the training data.

19. The AI system of claim 17 further comprising a model publishing system comprising:
a network attached storage server storing the retrained models included in the target model set;
a heterogenous group of testing servers; and
a computer network providing each member of the heterogenous group data access to the target model set stored on the network attached storage server;
wherein, the heterogenous group comprises:
a first testing server configured to test the target model set in a development environment;
a second testing server configured to test the target model set in a certification environment; and
a third testing server configured to test the target model set in a production environment.

20. The AI system of claim 17 wherein the AI engine determines which machine learning models require retraining by submitting the applied changes to each of the plurality of models and determining whether the applied changes trigger a threshold deviation between an actual output of each model relative to an expected output associated with each model.

* * * * *